United States Patent [19]

Margulis

[11] Patent Number: 4,569,147
[45] Date of Patent: Feb. 11, 1986

[54] MINIMAL WEIGHT FISHING LURE PRODUCING OSCILLATORY MOTION, AND UTILIZING INTERCHANGEABLE PARTS

[76] Inventor: Howard Margulis, 3466 Colwyn Ct., Orlando, Fla. 32806

[21] Appl. No.: 587,249

[22] Filed: Mar. 7, 1984

[51] Int. Cl.⁴ ............................................. A01K 85/06
[52] U.S. Cl. .................... 43/26.2; 43/42.19; 43/42.22; 446/159; 446/217
[58] Field of Search ............... 43/26.2, 26.1, 42.19, 43/42.22, 42.23; 446/158, 159, 217

[56] References Cited

U.S. PATENT DOCUMENTS

| | | | |
|---|---|---|---|
| 798,836 | 9/1905 | Sherbrook | 43/26.2 |
| 966,068 | 8/1910 | Williamson | 43/26.2 |
| 1,521,090 | 12/1924 | Goble | 43/26.2 |
| 1,627,512 | 5/1927 | Hughes | 43/26.2 |
| 2,521,852 | 9/1950 | Jones | 43/26.2 |
| 2,608,016 | 8/1952 | Shipley | 43/42.22 |
| 3,505,753 | 4/1970 | Henderson | 43/26.2 |
| 4,044,491 | 8/1977 | Potter | 43/42.22 |

Primary Examiner—Gene P. Crosby
Attorney, Agent, or Firm—Julian C. Renfro

[57] ABSTRACT

A fishing lure of minimal buoyancy, having a propeller-driven tail that wriggles realistically in response to motion of the lure through the water. Minimal buoyancy is assured by the use of small diameter wire in the construction of the body of the lure, and mounting arms provided on upper and lower parts of the body of the lure permit the addition of weights, floats, or control surfaces so that the lure will run at a desired depth, such as during trolling. The fish hook is preferably disposed in the tail of the lure, which tail is readily detachable from the body of the lure when a fish is caught. Versatility of the lure is assured by the tail and the propeller being readily exchangeable for devices of a different configuration, such as when operating conditions, or the fish being sought, warrant a change.

18 Claims, 13 Drawing Figures

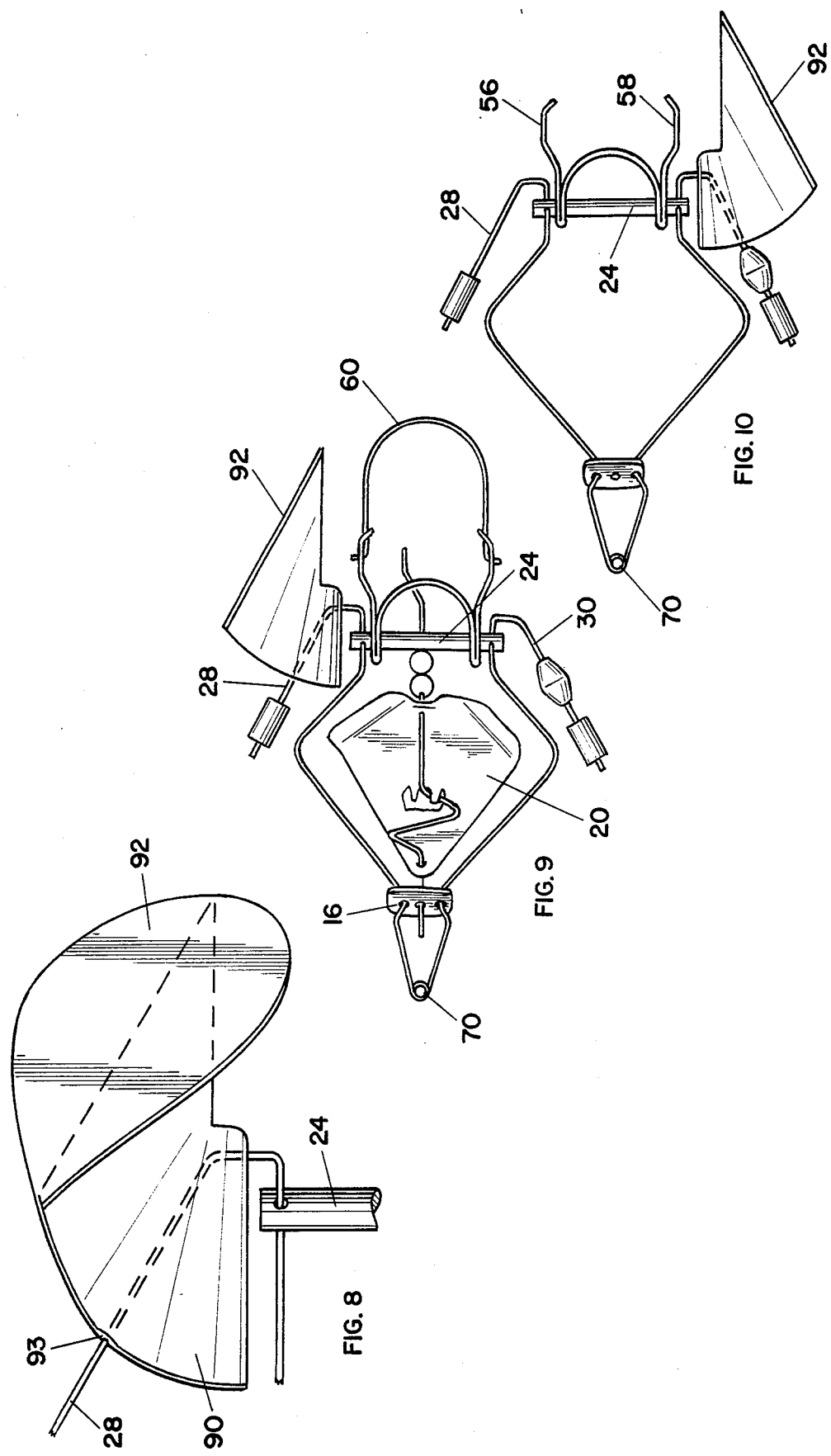

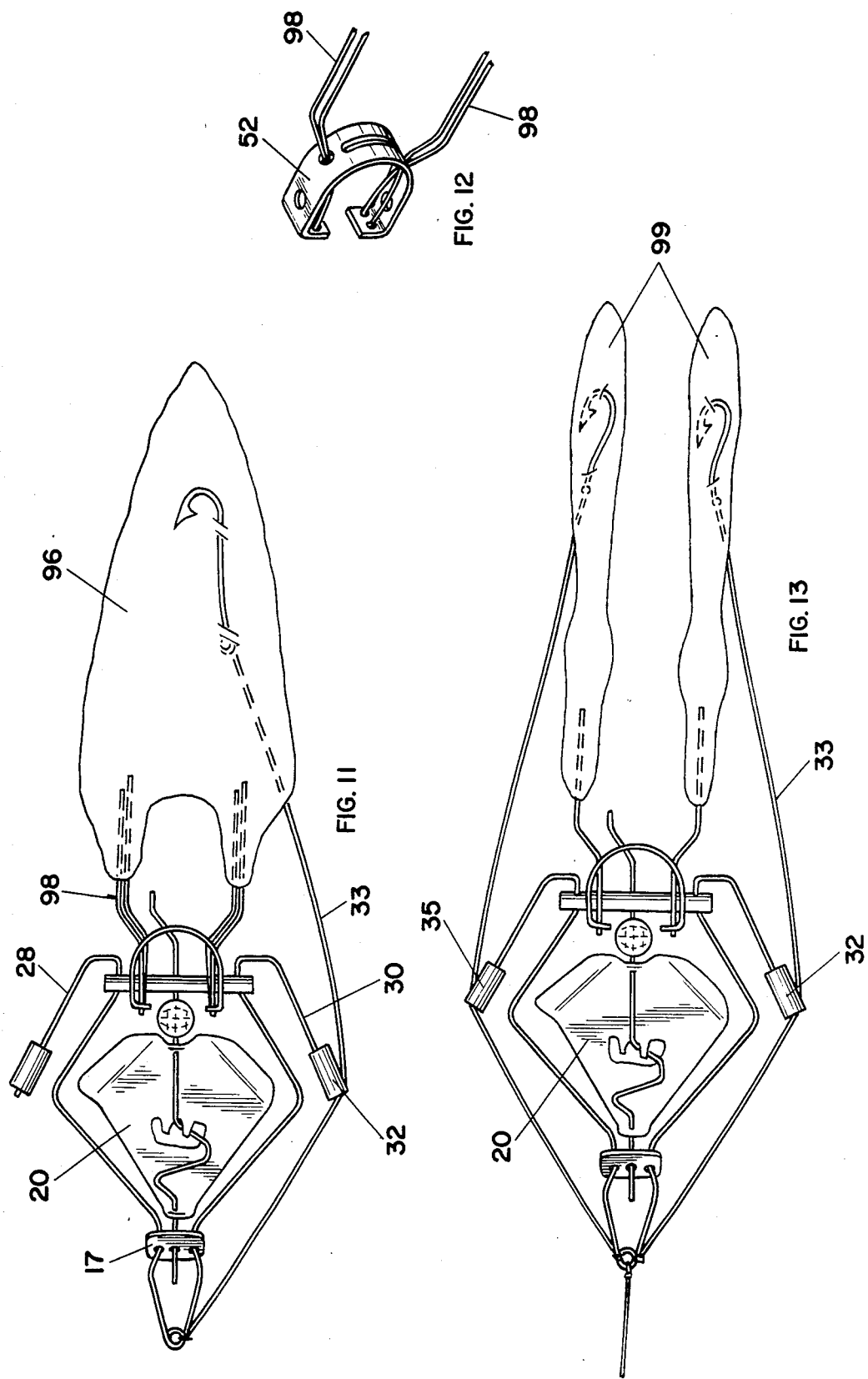

MINIMAL WEIGHT FISHING LURE PRODUCING OSCILLATORY MOTION, AND UTILIZING INTERCHANGEABLE PARTS

BACKGROUND OF THE INVENTION

In the past a number of animated fishing lures have been proposed, offering a variety of motions designed to attract fish. A common ingredient in such prior art devices was the use of a propeller, typically in the front portion of the device that served, when moving through the water, to cause one or more desired motions of the lure.

Some of these devices have been successful, while others have not, with cost and unnecessary complexity being factors that were seemingly overlooked in many of the prior art designs.

My studies have shown that certain organs of fish are quite sensitive to oscillating motions in the water, with the result that out of curiosity or excitement, a fish swims toward a device representing the source of such vibration, and hopefully becomes hooked thereon. Despite the attractiveness of many lures, most fishermen will not continue to use lures that are too difficult to keep in operating order, or that are too awkward to deploy, or too expensive.

Many of the prior art artificial lures have had a cavity of substantial size in the body portion of such device, which created buoyancy problems that had to be compensated for by the use of weights. As a result, the lure became quite heavy, difficult to operate, and expensive to manufacture and maintain.

Accordingly, it has been my goal to evolve a fishing lure that will prove highly satisfactory in every regard.

SUMMARY OF THE INVENTION

My fishing lure is of the type utilizing a body of light weight and low buoyancy, in which is mounted a propeller that rotates as a result of water passing thereover. The propeller provides a desirable and effective oscillatory motion to the tail of the device, with this motion being achieved in a straightforward yet inexpensive manner. The body portion is preferably created by bending a wire to serve as a support for the propeller, and for the support of the tail, which moves to simulate in a very realistic manner, the motion of an aquatic animal.

My propeller is preferably mounted on an individual, rotationally mounted wire that is disposed approximately in a central portion of the body of the lure, with an "offset" being located at the aft end of the propeller wire. Interacting with this offset is a device I choose to call a spherical sliding oscillator, which contains a slot in which the offset of the propeller shaft moves during its rotations. Such circular movements of the offset due to propeller rotation are thus converted to oscillatory motions by the spherical sliding oscillator, and those motions, in turn, are transferred to the tail of the lure, so that it will wriggle in a most realistic manner.

The fish hook is carried in the tail, and is preferably attached to a drop line connected directly to a loop in the nose portion of the lure. Upon a fish seizing the hook, the tail is arranged to break away, so that the fish is connected by the drop line directly to a loop at the nose of the device. The body portion of the lure is not lost during this procedure, but is carried and supported by the loop in nose portion, for recovery at the time the fish is landed.

My simplified yet highly advantageous arrangement offers a number of options to the fisherman, including the ability to substitute one propeller for another, when it may be desirable to change the speed of rotation, the color or texture of the propeller, or the like.

Importantly, the construction of my lure comprehends an ability to select the depth at which the lure operates, and such is made possible by the use of arms upon which weights or buoyant devices may be installed, such that depth of operation at a desired level may be readily achieved. Such a depth control feature readily enables a fisherman to use a multiplicity of my lures in close proximity to each other, for tangling of such lures is minimized by causing them to operate at respective selected depths.

Depth control may also be effected in accordance with this invention by the use of a device having a control surface thereon that is disposed at an angle to the centerline of the device. Such control surface may be disposed at an angle as will cause the lure to run deeper, or alternatively, the control surface may be disposed at an angle as will cause the lure to run shallow.

As mentioned above, my lure utilizes a breakaway tail construction, and this in turn makes it possible for the fisherman to select a tail (or hook and tail) that is appropriate in each instance, taking into consideration size, texture, color and the like, as may be appropriate for particular types of fish. Multiple tails, each using a respective hook, can also be utilized in accordance with this invention.

As should now be apparent, my lure is versatile in many degrees, and affords a fisherman the opportunity to control the behavior of the lure, as is appropriate for a given circumstance, with this being achieved in a device that is inexpensive to manufacture, simple to keep in working order, and a sheer delight to use.

It is therefore a principal object of my invention to provide a fishing lure of reasonable cost that affords a sport fisherman, the maximum degree of control over the behavior of the lure.

It is another object of my invention to provide a fish lure characterized by its simplicity of construction and operation, yet affording the fisherman close control of the action of the lure.

It is still another object of my invention to provide a fishing lure featuring a realistic wriggling motion that has proven very attractive to sport fish.

It is yet another object of my invention to provide a fishing lure deriving a highly effective oscillatory motion with the use of a minimum number of components.

It is yet still another object of my invention to provide a fishing lure of low weight and low buoyancy, in which an oscillatory motion is integrated into the lure, and dominates the activity of the lure.

It is still another object of my invention to provide a fishing lure needing scant maintenance, whose depth of operation can be readily selected.

It is still yet another object of my invention to provide a fishing lure that is inexpensive to manufacture, simple to keep in good repair, and which offers a variety of behavoiral modes, between which the fisherman can select for a given occasion.

These and other objects, features and advantages will be more apparent as the description proceeds.

BRIEF DESCRIPTION OF DRAWINGS

FIG. 8 is a perspective view revealing the type of lifting surface that I may employ in determining the depth at which my lure operates;

FIG. 9 is a side elevational view revealing the use of a lifting surface placed to cause the lure to move upwardly in the water;

FIG. 10 is a view similar to FIG. 9, but in less detail, and showing how a lifting surface can be utilized for causing the lure to run deeper;

FIG. 11 is a view showing a modified arrangement for holding the tail member in place using a plurality of short, thin wires, with this embodiment involving the use of a single hook;

FIG. 12 is a fragmentary perspective view revealing in more detail, the thin wires I utilize in the embodiment of FIG. 11 for holding the tail member in place; and FIG. 13 is an embodiment involving the use of two separate tails held on by wire members, with each tail member having its own hook.

DETAILED DESCRIPTION

Figure 1:
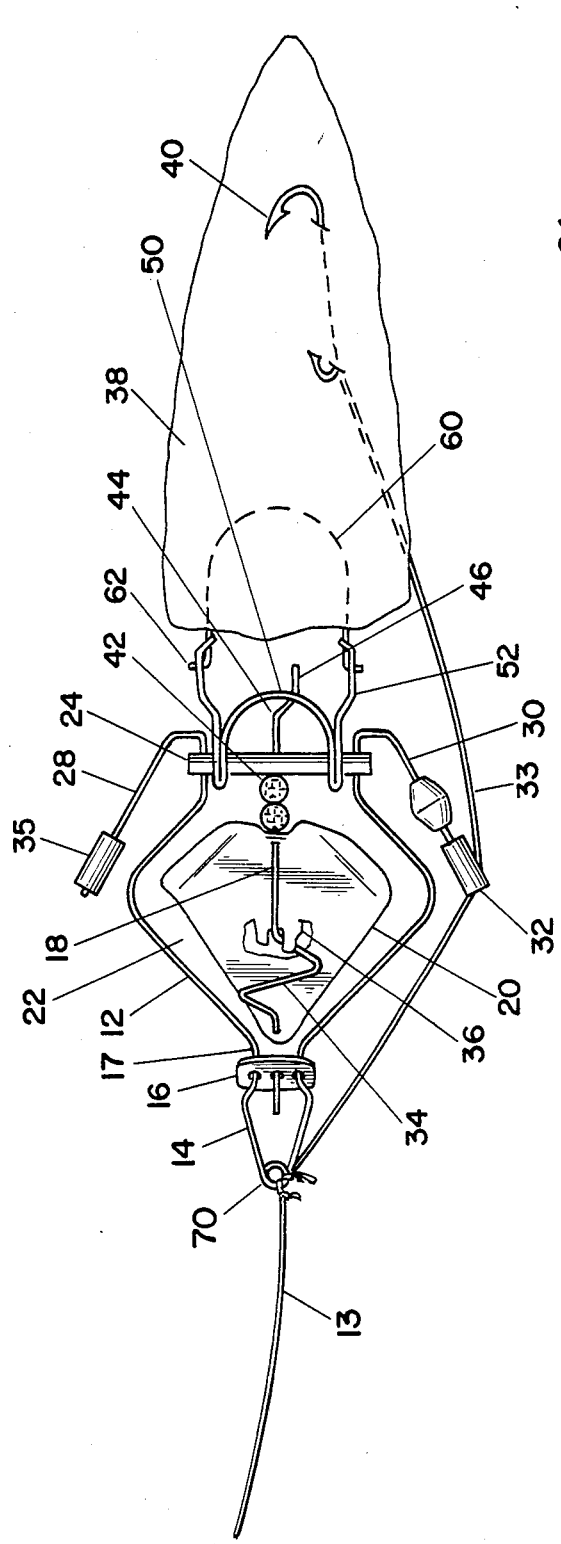
FIG. 1 is a side elevational view depicting my lure in approximately a proper and typical operating position.

Turning first to FIG. 1, I there show a preferred form of my fishing lure 10, involving a frame member 12 upon which various components in accordance with this invention are mounted. The frame is typically made of wire, such as of stainless steel, and preferably of a diameter ranging between 0.020 and 0.040 inches. In a manner of speaking, the frame member therefore may be regarded as two dimensional, having length and width.

The front or nose portion 14 of the frame is elongate, so as to form a location at which a fishing line 13 may be attached to a loop at the forwardmost section of the nose such that the lure can be cast, and thereafter pulled through the water. Optionally, I may use a swivel at the front of the device. A slip-on collar 16 may be slid over the nose portion 14, to form a forward support for the shaft 18 of propeller 20. A necked-down portion 17 exists just behind the nose portion 14, in which the slip-on collar normally resides. The collar arrangement I use simplifies the changing of the propeller on occasion, and the details of the collar will be discussed hereinafter in connection with FIG. 6.

Preferably a single piece of wire is used in the construction of the frame member 12, with the nose portion typically being at approximately the mid-portion of the length of wire as work thereon is commenced.

Figure 2:
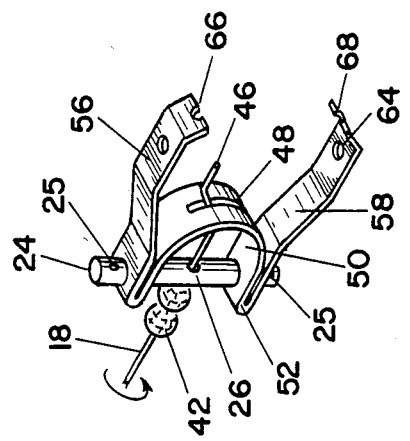
FIG. 2 is a fragmentary view, showing my spherical sliding oscillator in greater detail.

The frame components behind the nose portion diverge to form a clear area 22 of comparatively large size, in which the propeller 20 is rotatably mounted. Thereafter, the frame components approach each other so as to pass through holes 25 disposed adjacent the upper and lower ends of the rear support member 24; note FIG. 2. A third hole, hole 26, disposed through the rear support member 24 at a location midway between the two holes 25, forms the support for the rear part of the rotatable shaft 18. The hole 26 may be regarded as a rear bearing for the shaft 18.

After passing through the rear support member 24, the frame components bend severely, so as to extend somewhat forwardly as well as outwardly, as revealed in FIG. 1. These two terminations form depth control mountings 28 and 30, that are located in the plane of the frame members in the immediate vicinity of, but outboard of, the propeller 20.

Figure 3:
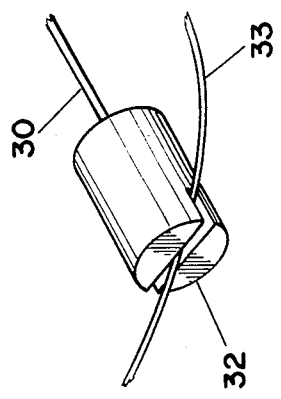
FIG. 3 is a fragmentary view of the line guide I use to keep the drop line in the proper position.

Hereinafter will be set forth more detail regarding the various components that may be installed upon the mountings 28 and 30, and for example, these may include a line guide 32 that is slotted to form an intermediate support for drop line 33; note FIG. 3. The line guide 32 also serves to safeguard against loss, the weights or buoyant members that may be installed upon the member 30. Somewhat similarly, a member 35 may be used in order to prevent loss of weight or buoyant components from mounting 28.

Returning to FIG. 1, it is to be noted that the shaft 18 is bent to form a zig-zag 34, which may be located at approximately the mid-point of one side of the propeller 20. This forms a propeller shaft lock, that guarantees the propeller rotation being transmitted to the shaft. Preferably, I create a small flap of metal 36 out of a central portion of the zig-zag. In that way, the shaft 18 is locked against the slippage with respect to the propeller, and vice versa.

Inasmuch as it is desired for the propeller to be turned by the water at a fairly rapid rate, and convey a "wriggling" type of motion of the tail member 38 that contains the hook 40, I use two or so bearing/spacer members 42 on the shaft 18, between the rear of the propeller 20, and the rear support member 24. These members serve to minimize friction to rotation, and to keep portions of the propeller from striking or rubbing against parts of the frame member 12.

In order to best utilize the propeller rotation caused by movement of the lure through the water, I create a bend 44 in the propeller shaft 18, at a location immediately aft of the rear support member 24. This bend may be roughly analogized to the throw of a crankshaft. Two separate bends, spaced slightly apart, and each preferably less than 90° may be utilized to create an offset 46 generally parallel to shaft 18, and spaced laterally therefrom in the general range of from $\frac{1}{8}''$ to $\frac{1}{4}''$.

The offset 46 is designed to interact in the manner of a cam with the elongate slot 48 of the somewhat hemispherically-shaped portions 50 of the oscillatory member 52. More particularly, the slot 48 extends for a sufficient distance or width as to be able to accomodate the up-and-down motion of the offset 46 as the propeller 20 drives it in rotation. Note FIG. 2 in particular. As will soon be discussed, the result of these constructional details is the conversion of the propeller motion into a desired, wriggling type motion of the tail member 38.

Figure 4:
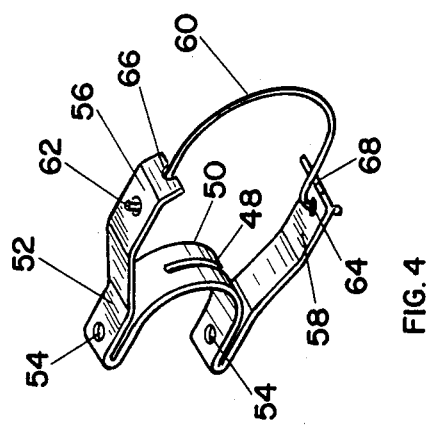
FIG. 4 is a fragmentary view showing the mounting wire associated with the tail, this mounting wire being supported by the upper and lower arms of the sliding oscillator member.
Figure 7:
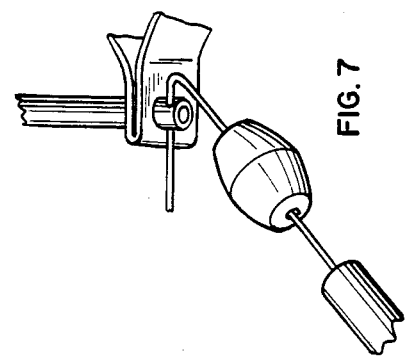
FIG. 7 is a fragmentary view of the depth control arrangement I may on occasion prefer to use.

As best seen in FIG. 4, the somewhat hemispherically shaped portion 50 may be formed in the central part of a single ribbon of metal that has been bent to form the oscillatory member 52. The member 52 is to be mounted upon the rear support member 24 in a non-binding way.

To this end, and as revealed in FIG. 4, a pair of aligned holes 54 of the proper diameter is located in the upper and lower arms of the member 52, such that this member may be installed in a non-binding manner upon the rear support member 24. As is obvious, the member 52 must be installed upon the member 24 before the rear wire portions are threaded through the holes 25, and then bent forwardly to form the depth control mountings 28 and 30. The member 52 is preferably made of brass, plastic, aluminum, or stainless steel.

Upon a fish striking at the wriggling tail member 38 and being caught upon the hook 40 implanted in the tail, it is desirable for the tail to detach from the oscillatory member 52, such that the drop line 33 will interconnect the hook (and fish) with the principal fishing line 13 through the use of the loop in the nose section, as shown in FIG. 1.

To simplify the detachment of the tail member, I preferably mount the forward end of the tail member upon a loop or mounting wire 60, as revealed in FIG. 1. This loop 60 is of spring material, and is equipped with upper and lower bends or offsets 62 that are arranged to fit into upper and lower holes 64 in the arms 56 and 58 of the oscillatory member 52. Stability for the loop 60 as it is carried by the upper and lower arms 56 and 58 is provided in the form of notches 66 and 68 located in the rear or end parts of the arms 56 and 58, respectively.

I have found that it is not desirable to require a large force pulling on the hook to cause a detachment of the mounting wire 60 from the arms 56 and 58 of the oscillatory member. The breakaway force can be controlled by the length of the offsets 62, and the strength and/or rigidity of the wire constituting the loop 60.

Figure 5:
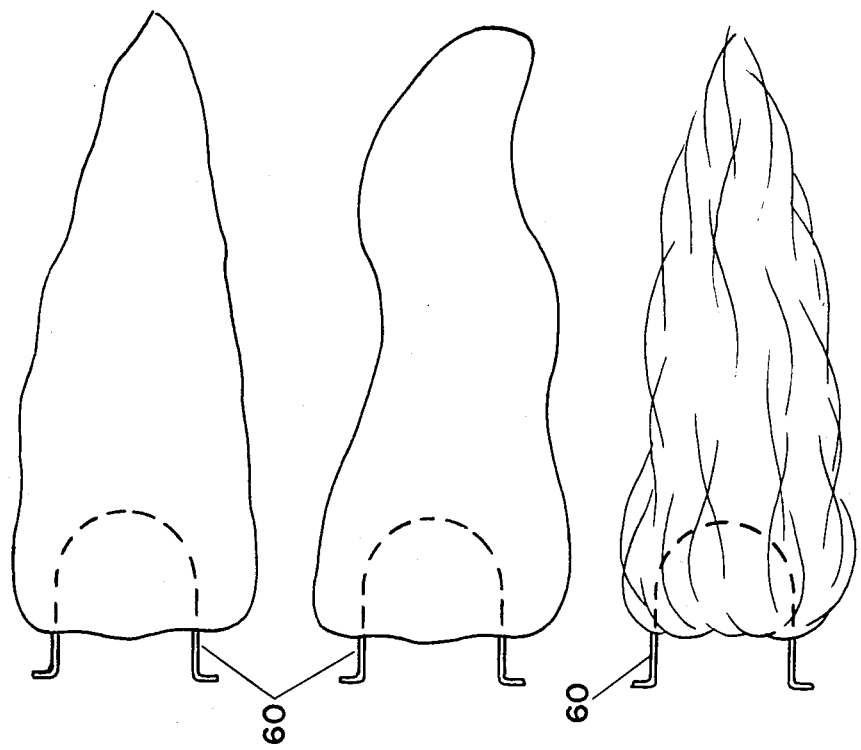
FIG. 5 is a view revealing several different types of tails that may be readily substituted on the lure.

FIG. 5 reveals that the fisherman can select from a variety of tails, depending upon the conditions under which he is operating, and upon the fish that he is principally seeking. These tails can be plastic or fabric, and of various colors and textures. Instead of being leaf-like, the tails can be in the form of a multiplicity of short streamers, or the like, as shown by the lowermost tail embodiment in FIG. 5.

I preferably equip each tail member with its own mounting wire or loop 60, so to change tails, it is but a simple matter for the fisherman to squeeze the upper and lower portions of the loop between his thumb and fingers, in order to cause the offset portions 62 to detach from the upper and lower arms 56 and 58. Thereafter, to complete the substitution, the fisherman need only squeeze the loop 60 of the selected tail, and then insert its offset members into the aligned holes 64 in the arms 56 and 58. As is obvious, the breakaway tail must not come loose during casting, such as upon impact with the water, nor during trolling.

As earlier indicated, when a moderately strong force is encountered, such as a fish taking the hook, the tail readily detaches from the oscillatory member 52, such that the drop line 33 will carry the weight of the fish and transfer this load to the loop 70, that is in turn attached to the fishing line 13. It is to be noted that the frame member and propeller portion is not then lost, for latter section is connected by loop 70, and remains attached to the principal fish line 13.

It is always possible for the hook 40 to become snagged, even though a so-called weedless hook is used. To this end, I may wish to make the drop line 33 of a smaller test strength than the test strength of the principal fish line 13. In that way, should the hook become snagged, the drop line will break before the principal line, thus allowing only the hook and tail, and not the body portion and propeller section, to be lost.

Figure 6:
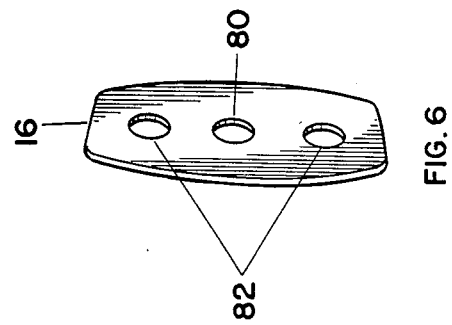
FIG. 6 is a showing of the type of slipon collar I may wish to use on the front of the device, for propeller release on occasion.

Since the fisherman may wish to use this lure for a variety of purposes, including use for catching different types of fish, I make it possible by my advantageous design, for the fisherman to accomplish a propeller substitution quite easily. With reference to FIG. 6, it will be noted that slip-on collar 16 is equipped with a center hole 80 to accomodate the forward end of the propeller shaft 18. The collar 16 is also furnished with outer holes 82, through which pass the wire portions constituting the frame 12.

Because the nose portion 14 is necked down at 17, which is a location in which it is appropriate for the collar 16 to reside, the collar does not have any tendency to move forward, which would bring about an unfortunate release of the forward end of the propeller shaft 16. However, should the fisherman wish to substitute for the propeller 20, a propeller of a different size, configuration, color or the like, the propeller presently in place can readily be released by sliding the collar 16 forwardly, out of the necked-down portion, and toward the loop 70. This of course moves the hole 80 for the propeller shaft away from the position supporting this shaft. Upon this being done, the propeller can be removed from the clear area 22 of the frame or body 12, and the offset 46 then removed from contact with the slot 48 of the member 52.

Because the bends in the aft section of the propeller shaft 18 are less than right angle bends, it is not difficult to slide the rear portion of the shaft 18, including the offset 46, out of the hole 26 in the approximate center of the rear support member 24. Upon this being accomplished, the propeller and its shaft are entirely free of the body or frame 12, so that substitution of the selected other propeller can be brought about.

As is obvious, the aft portion of the replacement propeller shaft is inserted into hole 26, to a depth such that the offset 46 resides properly in the slot 48 of the hemispherically-shaped portion 50 of the oscillatory member 52. Then, the forward end of the propeller shaft 18 is brought into alignment with the hole 80 of the collar 16, and the collar slid rearwardly into the necked-down portion 17, where it is retained by virtue of the fact that the holes 82 of the collar are of a spacing considerably less than the spacing between the outside portions of the nose portion 14. The forward end of the propeller shaft is supported in central hole 80, as previously mentioned.

The propellers I prefer to use in this device have a definite helical twist, such that relative motion between the water and the propeller will cause the rotation of the latter component. The propellers may be stamped out of plastic, out of non-corrosive metal, or out of ferric metal that has been coated with one or more protective layers. Quite clearly the fisherman may stock propellers of varying pitch, and the propeller shafts may have throws 46 of greater or less dimension, so that the amount of tail oscillation can be closely controlled.

One very significant aspect of my invention involves the fact that the buoyancy of my lure can be readily changed, such that it runs at a selected depth when moving through the water. Any buoyant components used, like the weights that also may be used, are pierced with a central hole, such as to enable ready insertion upon the mountings 28 and/or 30. When weights are used, typically a greater amount of weight is used on the lower mounting 30, than on the upper mounting 28, such that the lure will travel through the water substantially in an upright position, as shown in FIG. 1. Somewhat similarly, if buoyant components are used, such as of cork, balsa wood, or the like, a greater amount of buoyancy is used on the upper mounting 28, than on mounting 30, for reasons of stability of the lure in a desirable position.

In all instances, the final component inserted upon the mounting 28 or 30 is preferably in the nature of a piece of rubber, somewhat like an eraser, which serves to prevent loss of the weight or buoyant member, as the case may be. As mentioned in connection with FIG. 3, the rubber member is slotted when it is to serve as a line guide.

Additional means of depth control may be used if desired, such as disks or control surfaces inserted upon the members 28 or 30. FIG. 8 reveals an exemplary embodiment of a depth control component 90 having a control surface 92. The body portion of component 90 has an angled mounting hole 93 such that it can be received upon depth control mounting arm 28, for example. In such event, the control surface 92 is disposed at a substantial angle to the longitudinal centerline of the frame member 12.

FIG. 9 shows such device 90 in place upon a lure in accordance with my invention. Because the control device 90 has been placed on the upper arm 28 of the device in this figure, it will create lift, causing the lure so equipped to tend to rise in the water, and therefore to run comparatively shallow.

In FIG. 10, the propeller in the interests of simplicity is not shown, with this view being principally concerned with revealing that the control surface may be utilized on the lower depth control arm 30 of the lure. Because of the downward angle of this control surface, the lure will tend to run deep. A weight may or may not be used with such a control device 90, and its use is clearly optional. Likewise, the use of buoyant components therewith is also optional.

In FIG. 11 I show a single tail 96, much like one of the single tails of FIG. 5, but in this instance, the single tail is held upon the plurality of tiny wires 98 associated with the oscillatory member 52. Therefore, instead of utilizing an arcuately shaped mounting wire 60, I instead insert the tail directly upon the plurality of small wires, which are to be seen in FIG. 12 to extend through oscillatory member 52. Upon a fish being hooked, the tail readily detaches from the wires.

In FIG. 13, I show an embodiment of my device in which a pair of fish hooks are utilized, with each fish hook being accommodated within its individual tail member 99. As will be seen from this Figure, I prefer to insert each tail upon a pair or so of the tiny wires 98, although a separate arrangement could be utilized if desired. As is obvious, each hook is located on its own drop line, with the upper drop line passing through a slotted member 35.

As should now be obvious, my lure offers the fisherman an opportunity to closely control the behavior of the lure, and the versatility of my device is such that fishing can be effective in a variety of different water conditions. Furthermore, the activity or appearance of the lure can be selected in accordance with the specie of fish being sought.

Since the body of my device is of wire, fabrication by semi-skilled labor is readily accomplished, thus minimizing manufacturing costs. Also, no hollow body portion having undesirable buoyancy characteristics is involved in my device.

Other changes within the scope of the claims of this application may be effected, and I am not to be limited to the details of the illustrated embodiments.

I claim:

1. A fishing lure comprising an essentially two dimensional wire frame limited substantially to length and width, said frame having front, middle, and rear portions, said front portion having a member to which a fishing line can be attached, said middle portion being enlarged so as to receive therein a shaft mounted propeller arranged to rotate as a result of water moving thereagainst, said rear portion utilizing a tail mounted for motion with respect to said frame, in which tail a fish hook is operatively mounted, a motion transmitting member operatively associated with said tail, the shaft upon which said propeller is mounted extending rearwardly, and having an offset in operational contact with said motion transmitting member, said motion transmitting member serving to convert the rotation brought about by the propeller into smooth oscillatory motion, whereby as said propeller rotates as a result of contact with the water, said tail is caused to oscillate, and thus give a realistic motion to the lure.

2. The fishing lure as recited in claim 1 in which said fish hook is connected by a drop line to the fishing line attached to said front portion of said lure.

3. The fishing lure as recited in claim 1 in which said tail is mounted for ready detachment from said frame.

4. The fishing lure as recited in claim 3 wherein said tail is mounted upon a curved wire that can readily be attached to, or detached from, said motion transmitting member.

5. The fishing lure as recited in claim 3 wherein said tail is mounted upon a plurality of small wires.

6. The fishing lure as recited in claim 1 in which said frame includes portions used in connection with devices utilized for controlling the depth at which the fishing lure operates.

7. The fishing lure as recited in claim 6 in which said depth control devices entail the optional use of components of a floatation nature, as well as components causing the lure to sink deeper.

8. The fishing lure as recited in claim 6 in which said depth control devices entail components having control surfaces disposed at an angle to the longitudinal centerline of the fishing lure, with said control surfaces being angled either in the upward direction or the downward direction, so as to affect the depth at which the fishing lure operates.

9. The fishing lure as recited in claim 1 in which said propeller is readily removable, such that a different propeller can be substituted.

10. The fishing lure as recited in claim 1 in which buoyancy of the lure is minimized by metal wire being utilized in the construction of said front and middle portions of said lure.

11. A fishing lure of minimal buoyancy comprising a comparatively flat frame having a front portion, a middle portion, and a rear portion, said front portion having a member to which a fishing line can be attached, said middle portion being enlarged so as to receive therein a shaft mounted propeller arranged to rotate as a result of water moving thereagainst, said front and middle portions being made of metal wire, and said rear portion utilizing a readily detachable tail member hingedly mounted upon said frame and containing a fish hook, a motion transmitting member operatively associated with, and connected to said tail member, the shaft upon which said propeller is mounted extending rearwardly, and having an offset in operational contact with said motion transmitting member, said motion transmitting member serving to convert the rotation brought about by the propeller into smooth oscillatory motion, whereby as said propeller rotates as a result of contact with the water, said tail member is caused to oscillate, and thus give a realistic motion to the lure, said tail detaching upon a fish being hooked.

12. The fishing lure as recited in claim 11 in which said tail is mounted upon a curved wire that can readily be attached to, or detached from, said motion transmitting member.

13. The fishing lure as recited in claim 11 in which said tail frictionally engages a plurality of small wires.

14. The fishing lure as recited in claim 11 in which said fish hook is connected by a drop line to the fishing line attached to said front portion.

15. The fishing lure as recited in claim 11 in which said frame includes portions used in connection with devices utilized for controlling the depth at which the fishing lure operates.

16. The fishing lure as recited in claim 15 in which said depth control devices entail the optional use of components of a floatation nature, as well as weighted components causing the lure to sink deeper.

17. The fishing lure as recited in claim 15 in which said depth control devices entail components having control surfaces disposed at an angle to the longitudinal centerline of the fishing lure, with said control surfaces being angled either in the upward direction or the downward direction, so as to directly affect the depth at which the fishing lure operates.

18. The fishing lure as recited in claim 11 in which said propeller is readily removable, such that a different propeller can be substituted.

* * * * *